No. 747,535. PATENTED DEC. 22, 1903.
W. E. BURROWS.
HORSE HAY RAKE.
APPLICATION FILED APR. 30, 1903.
NO MODEL. 2 SHEETS—SHEET 1.
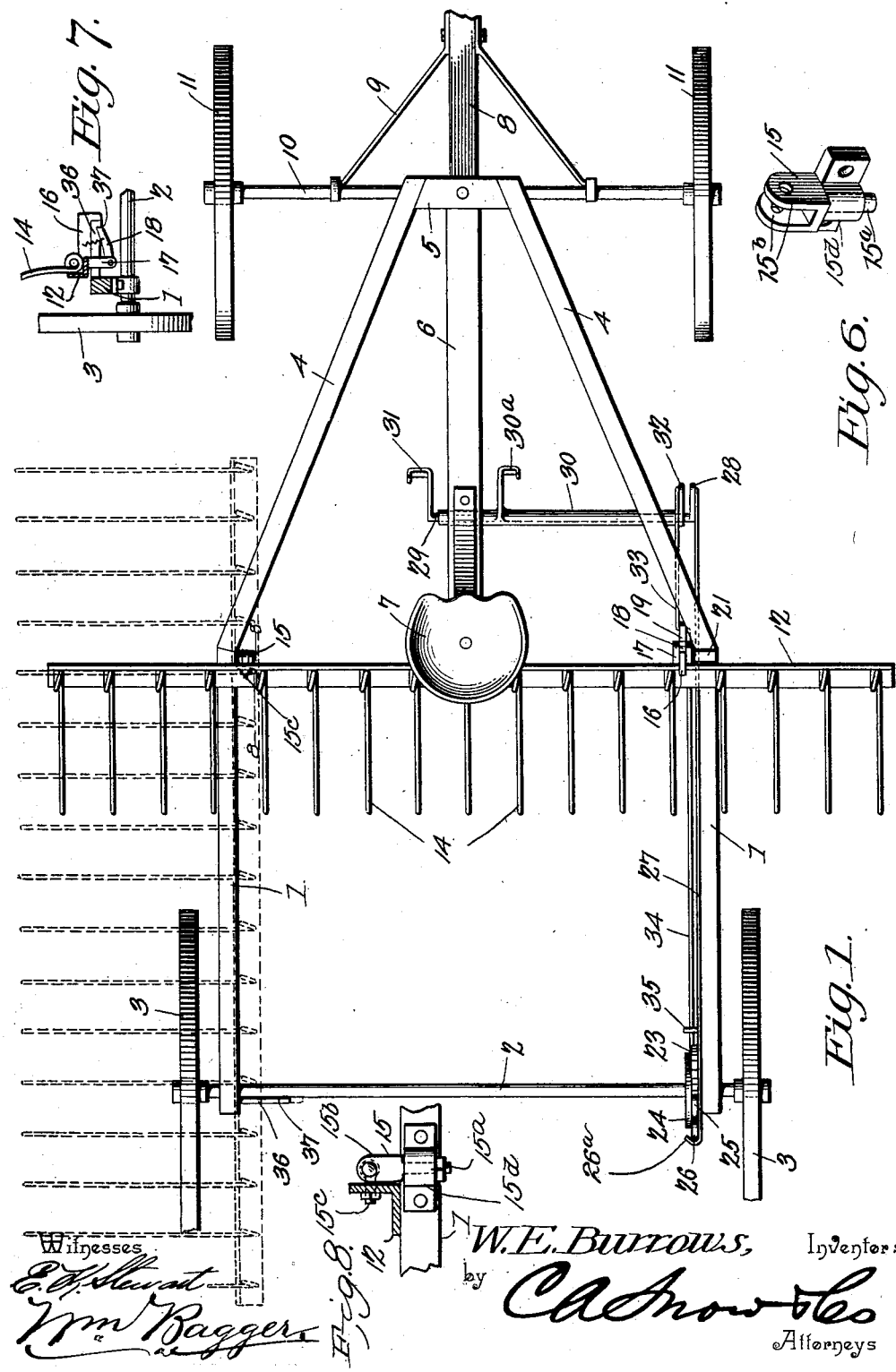
Witnesses W. E. Burrows, Inventor:
by C. A. Snow & Co
Attorneys No. 747,535. PATENTED DEC. 22, 1903.
W. E. BURROWS.
HORSE HAY RAKE.
APPLICATION FILED APR. 30, 1903.
NO MODEL. 2 SHEETS—SHEET 2.
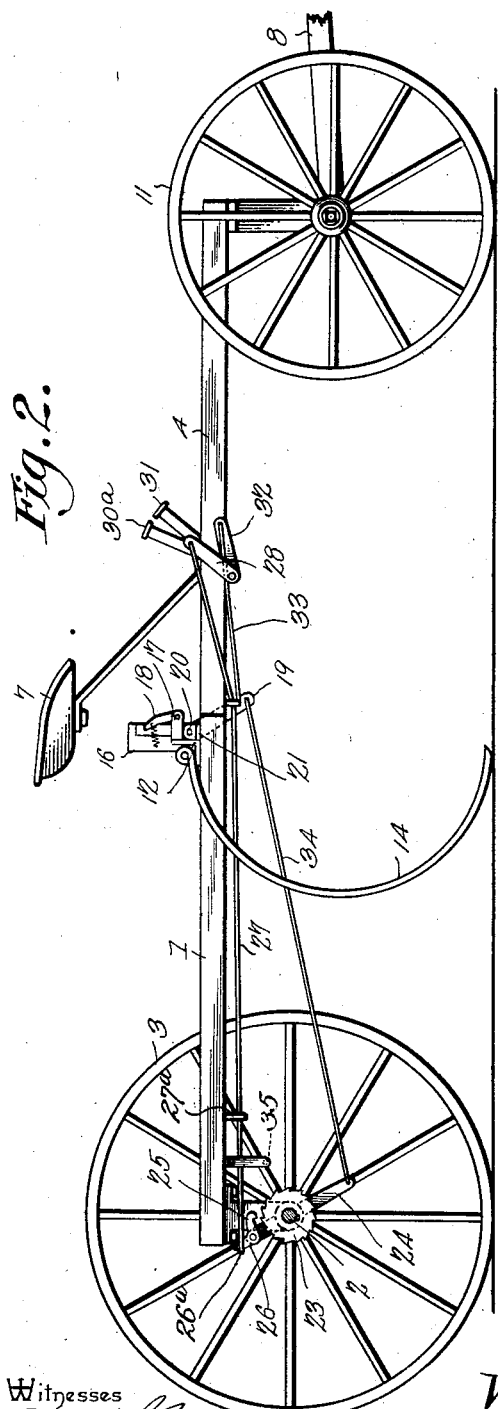
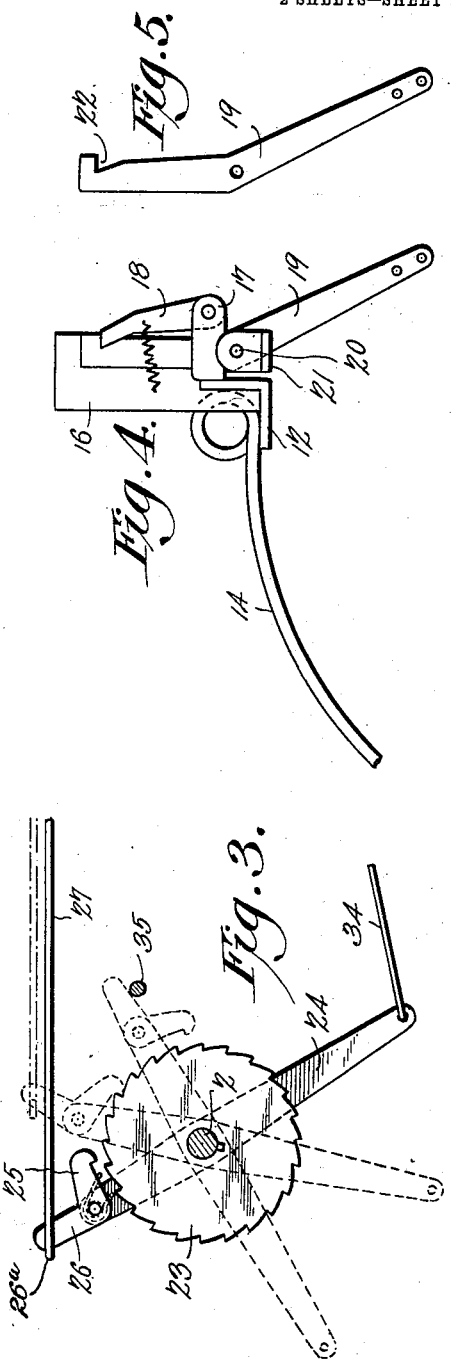
Witnesses
W. E. Burrows, Inventor
Attorneys No. 747,535.                                     Patented December 22, 1903.

UNITED STATES PATENT OFFICE.

WILLIAM EMMERSON BURROWS, OF ROSENDALE, MISSOURI.

HORSE HAY-RAKE.

SPECIFICATION forming part of Letters Patent No. 747,535, dated December 22, 1903.

Application filed April 30, 1903. Serial No. 155,038. (No model.)

*To all whom it may concern:*

Be it known that I, WILLIAM EMMERSON BURROWS, a citizen of the United States, residing at Rosendale, in the county of Andrew and State of Missouri, have invented a new and useful Horse Hay-Rake, of which the following is a specification.

This invention relates to horse hay-rakes, and it has for its object to provide a device of this class which shall possess superior advantages in point of simplicity, durability, and general efficiency.

A special object of my invention is to provide a rake which when being transported shall occupy space only slightly exceeding the width of an ordinary farm-wagon in order that it may be conveniently transported over narrow roads and through gates and obstructions which will admit of the passage of an ordinary wagon.

Another object is to devise improved means whereby the rake-head, which is for the purposes of my invention supported upon a four-wheeled frame, may be partly disconnected from said frame and disposed in a longitudinal position, so that neither end of the rake-head shall extend beyond the width of the wheeled frame.

With these and other objects in view my invention consists in the improved construction, arrangement, and combination of parts, which will be hereinafter more fully described, and particularly pointed out in the claims.

In the accompanying drawings, Figure 1 is a top plan view of a hay-rake constructed in accordance with the principles of my invention, with dotted lines indicating the position of the rake when disposed for transportation. Fig. 2 is a side elevation. Fig. 3 is a detail view of the ratchet-wheel and pawl for tilting the rake-head. Fig. 4 is a detail view showing the free end of the rake-head and the means for connecting the same with the hinge-rod connected with the frame. Fig. 5 is a detail side view of said hinge-rod. Fig. 6 is a perspective detail of the joint permanently connecting the rake-head with the frame. Fig. 7 is a sectional detail view of the device for supporting the free end of the rake-head when in position for transportation. Fig. 8 is a detailed elevation taken on the line 8 8 in Fig. 1.

Corresponding parts in the several figures are indicated by similar numerals of reference.

The frame of my improved rake comprises side bars 1 1, provided at their rear ends with bearings for an axle 2, having the rear supporting-wheels 3. Suitably connected with the side bars 1 1 are forwardly-converging side bars 4 4, the forward ends of which are connected by a block 5, resting upon the reach 6, which is extended rearwardly as far as the front ends of the side pieces 1 1 and which supports the driver's seat 7. Suitably bolted to the sides of the tongue 8, which extends forwardly from the reach, are rearwardly-diverging braces 9, having bearings for the front axle 10, mounted upon the front supporting-wheels 11.

12 designates the rake-head, which is provided with spring-teeth 14 of ordinary construction. Said rake-head is flexibly connected with one of the side bars 1 of the frame by means of a joint which comprises a bearing-plate $15^d$, secured to the said side bar and having a vertical bearing for a shank $15^a$, which is swiveled therein and which carries at its upper end a head 15, comprising perforated lugs $15^b$, the latter being spaced apart to receive between them an eyebolt $15^c$, which is secured by means of a nut upon the angle-bar which constitutes the rake-head. A pivotal bolt connects the perforated ears $15^b$ with said eyebolt. It will be observed that by the construction of this joint the rake-head may be raised vertically at its free end, while it is also enabled to swing to the longitudinal position. (Indicated in dotted lines in Fig. 1.) The rake-head is detachably connected with the frame-bar 1 at the opposite side of the device by means of a clasp comprising an upright 16, permanently secured to the rake-head and having a pair of forwardly-extending arms or brackets 17, between which is pivoted a spring catch or pawl 18.

19 designates a hinge-rod which is pivotally connected at 20 with the frame of the machine, which may be provided with a suitable boxing 21 for the pintle-pivot of said hinge-rod. The latter is provided near its upper end with a notch 22, which when the said hinge-rod is inserted between the arms 17 of the clasp is engaged by the spring-pawl 18, thus connecting the rake-head with the hinge-rod 19 and enabling it to tilt with the latter.

23 designates a ratchet-wheel which is mounted firmly upon the rear axle of the machine, said axle 2 being mounted to rotate in its bearings.

24 designates an arm or lever which is mounted loosely upon the rotary axle 2 adjacent to the ratchet-wheel 23 and carrying a pawl or dog 25, having an upwardly-extending arm 26. The arm 26 is adapted to be engaged by a hook-shaped extension 26ᵃ at the rear end of a rod 27, the front end of which is connected with an arm 28, radiating from a shaft 29, which is journaled in a tubular shaft 30, which latter is mounted in suitable bearings upon the under side of one of the frame-bars 4 and the reach 6. The shaft 29 is provided at its opposite inner end with a treadle 31, by means of which it may be operated. The connecting-rod 27 may be mounted near its rear end in some suitable supporting device, such as a staple 27ᵃ, connected with the frame.

The tubular shaft 30 is provided at its outer end with an arm or crank 32, connected by a rod 33 with the hinge-rod 19 at a point near the lower end of the latter. Said hinge-rod is also connected by means of a rod 34 with the lower end of the lever 24, which is mounted loosely, as described, upon the rear axle 2 of the device. The inner end of the tubular shaft 30 has a foot piece or treadle 30ᵃ, by means of which it may be operated by the driver.

One of the frame-bars 1 is provided upon its under side with a laterally-extending pin 35, which lies in the path of the arm 26 on the pawl 25, so as to release the said pawl from engagement with the ratchet-wheel 23 at the proper point. The opposite frame-bar 1 is provided on its inner side with a laterally-extending finger 36, having a notch 37 to be engaged by the spring-pawl 18 of the clasping device when the rake-head is adjusted in the longitudinal position. (Illustrated in dotted lines in Fig. 1.)

From the foregoing description, taken in connection with the drawings hereto annexed, the operation and advantages of my improved horse hay-rake will be readily understood. When the device is in its normal operative position, the free end of the rake-head is connected with the hinge-rod 19. When the rake in its progress over the field has accumulated a load, the rake-teeth may be tripped by the driver stepping upon the treadle 31 of the shaft 29, the crank of which, 28, is connected with the front end of the rod 27, the rear end of which is provided, as described, with a hook adapted to engage the arm 26 of the pawl 25, which latter is thus thrown into engagement with the permanently-rotating ratchet-wheel 23. It will be observed that the pawl-arm 26 is not permanently connected with the rod 27, but simply disposed in the path of the lateral extension thereof, so that when the arm 24 is caused to revolve by the ratchet-wheel 23 engaging the pawl 25 the said connecting-rod 27 will not be compelled to follow this movement. At the same time the lower end of the lever 24 will exercise, through the connecting-rod 34, a pulling action upon the lower end of the hinge-rod 19, which will result in tilting the rake-head and releasing the load. As soon as the arm 26 comes into contact with the pin 35 the pawl 25 is released and the rake-teeth by their own weight are returned to their normal position, in which they may be kept by the driver's foot engaging the treadle 30ᵃ, whereby a pull in a forward direction is exercised upon the lower end of the hinge-rod 19.

To the change the position of the rake-head to the desired position for transportation, the spring pawl or snap 18 is disengaged from the notch 22 in the hinge-rod 19, and the free end of the rake-head may then be disengaged from said hinge-rod by simply lifting it out of connection therewith, after which it may be swung in a rearward direction, the rake-teeth being lifted over the hind wheel of the machine and the attaching device, comprising the upright 16 and pawl 18, being placed in engagement with the notched hinge 36, which projects from the side bar of the frame, as clearly seen in Fig. 1 of the drawings. It is true that in this position the rake-teeth will project slightly at the side of the supporting-frame, but not sufficient to interfere with the passage of the device over roads and through gates or other obstructions through which an ordinary farm-wagon may pass.

This improved hay-rake is extremely simple in its construction, and it possesses many advantages over the form of hay-rakes which are now usually employed. The ordinary two-wheeled rake is usually provided with very high wheels, which are of themselves objectionable, inasmuch as the frame is easily racked and injured. Rakes of this nature are frequently incapable of passing over narrow roads, and in order to pass them through gates it is frequently necessary to turn them edgewise and to pull them through, thus involving a strain which is injurious to the rake, as will be readily understood. These annoyances and the delays occasioned thereby are entirely avoided by my improved rake, which being provided with four wheels is more firmly supported and capable of resisting greater strain. The rake-head being disposed between the front and hind wheels, I also to a large extent avoid the liability of hay becoming entangled with the operating mechanism and temporarily interfering with the progress of the rake.

I have in the foregoing described a simple and preferred construction of my invention; but I desire it to be understood that I do not limit myself with regard to the structural details of the same, but reserve the right to any changes, alterations, and modifications which may be resorted to within the scope of my invention and without departing from the spirit or sacrificing the utility of the same.

Having thus described my invention, I claim—

1. In a horse hay-rake, a carrying-frame, a rake-head, a joint flexibly connecting said rake with one side of the carrying-frame, a hinged rod at the opposite side of the carrying-frame, and means for connecting the rake-head detachably with said hinged rod.

2. In a horse-rake, the combination of a wheeled carrying-frame, a rake-head, a joint flexibly connecting said rake-head with one side of the carrying-frame, a hinged rod at the opposite side of the carrying-frame having a notch near its upper end, and a clasping device connected with the rake-head, adapted to engage the upper end of the hinged rod and having a spring-pawl adapted to engage the notch at the upper end of said hinged rod.

3. In a horse hay-rake, a carrying-frame, a rake-head, a joint flexibly connecting said rake-head with one side of the carrying-frame, a notched hinge-rod connected with the opposite side of the carrying-frame, permanent means upon the rake-head for detachably connecting the latter with said hinge-rod, and means for actuating said hinge-rod to tilt the rake-head.

4. In a horse hay-rake, a four-wheeled frame structure, a transversely-disposed rake-head, a joint flexibly connecting said rake-head with one side of the frame, a hinge-rod permanently connected with the other side of the frame, means for connecting the rake-head detachably with said hinge-rod, a ratchet-wheel revoluble with the rear axle, a lever mounted loosely upon said rear axle, a pawl connected pivotally with said lever adapted to engage the ratchet-wheel and having an upwardly-extending arm, a treadle near the front end of the frame, a rod connecting said treadle with the upwardly-extending arm of the pawl, and a trip disposed in the path of said pawl.

5. In a horse hay-rake, a four-wheeled frame structure, a rake-head, a hinge-rod associated with the frame structure and connected detachably with the rake-head, foot levers or treadles having cranks associated therewith, a ratchet-wheel revoluble with the rear axle, a lever mounted loosely upon said axle and having a pawl adapted to engage said ratchet, a link connection between said pawl and one of the treadle-operated cranks, a link connection between the other treadle-operated crank and the lower end of the hinge-rod, and a link connection between said hinge-rod and the lower end of the lever upon the rear axle.

6. In a horse hay-rake, a supporting-frame, a rake-head, a joint flexibly connecting said rake-head with one side of the frame, a hinge-rod associated with the upper side of the frame and having a notch, a clamping device associated with the rake-head and comprising a spring-pawl adapted to engage the notched hinge-rod, and a finger connected with the frame and adapted to engage the clamping device associated with the rake-head and to support the latter in a longitudinal position.

In testimony that I claim the foregoing as my own I have hereto affixed my signature in the presence of two witnesses.

WILLIAM EMMERSON BURROWS.

Witnesses:
ELI CORNELESION,
TAYLOR H. WEAVER.